US007910203B2

(12) United States Patent
Colella et al.

(10) Patent No.: US 7,910,203 B2
(45) Date of Patent: Mar. 22, 2011

(54) SELECTIVELY METALLIZED HEAT TRANSFER LABEL

(75) Inventors: Michael B. Colella, Southington, CT (US); Paul Giusto, Feeding Hills, MA (US); Eileen M. Norris, Tolland, CT (US)

(73) Assignee: Illinois Tool Works Inc., Glenview, IL (US)

( * ) Notice: Subject to any disclaimer, the term of this patent is extended or adjusted under 35 U.S.C. 154(b) by 650 days.

(21) Appl. No.: 11/848,855

(22) Filed: Aug. 31, 2007

(65) Prior Publication Data

US 2008/0063863 A1 Mar. 13, 2008

Related U.S. Application Data

(60) Provisional application No. 60/825,046, filed on Sep. 8, 2006.

(51) Int. Cl.
*B41M 5/40* (2006.01)
*B32B 7/12* (2006.01)
*B32B 15/04* (2006.01)

(52) U.S. Cl. ........ 428/343; 428/344; 428/346; 428/347; 428/352; 428/354; 428/32.6; 428/32.77; 428/32.78; 428/32.79; 156/230; 156/233; 156/234

(58) Field of Classification Search .................. 428/200, 428/347, 32.6, 32.77, 32.78, 32.79, 343, 428/344, 346, 352, 354, 40.1, 40.9, 41.1, 428/41.7, 41.8, 42.1; 156/230, 233, 234, 156/239

See application file for complete search history.

(56) References Cited

U.S. PATENT DOCUMENTS

| | | | | |
|---|---|---|---|---|
| 6,228,486 | B1 * | 5/2001 | Kittel et al. | 428/354 |
| 6,344,269 | B1 | 2/2002 | Makar et al. | |
| 6,423,406 | B1 | 7/2002 | Bilodeau | |
| 6,893,717 | B1 | 5/2005 | Tsai et al. | |
| 7,014,895 | B1 | 3/2006 | Grotefend et al. | |
| 7,021,549 | B2 | 4/2006 | O'Rell et al. | |
| 2002/0136866 | A1 | 9/2002 | Geurtsen et al. | |
| 2005/0100689 | A1 * | 5/2005 | He et al. | 428/32.79 |

FOREIGN PATENT DOCUMENTS

| | | |
|---|---|---|
| EP | 0992361 | 4/2000 |
| JP | 2000144076 | 5/2000 |
| JP | 2002145226 | 5/2002 |

OTHER PUBLICATIONS

International Search Report for PCT/US2007/019387.

* cited by examiner

*Primary Examiner* — Patricia L Nordmeyer
(74) *Attorney, Agent, or Firm* — Levenfeld Pearlstein, LLC

(57) ABSTRACT

A selectively metallized heat transfer label for transfer to a substrate includes a support portion having a carrier layer and a release layer applied to the carrier layer, and a transfer portion including a protective layer applied to the release layer, a metallizable layer applied to the protective layer, a metal layer applied to the metallizable layer, a metal transferring adhesive layer applied to the metal layer and configured to adhere to both the metal layer and the desired substrate and a non-metal transferring ink layer applied to the metal layer and configured to adhere to the desired substrate but not to the metal layer. When heat and pressure are applied to the carrier, the metal transferring adhesive adheres to both the metal layer and the substrate while the non-transferring ink layer adheres only to the substrate.

26 Claims, 2 Drawing Sheets

SELECTIVELY METALLIZED HEAT TRANSFER LABEL

BACKGROUND OF THE INVENTION

The present invention relates to heat transfer labels. More particularly, the present invention relates to a selectively metallized heat transfer label that allows the selective transfer of a metallic finish section of the label along with the transfer of a non-metallic ink section of the label in a single-step label application process.

Labels are in widespread use in most every industry. For example, labels are used to transfer indicia onto goods, including consumer items ranging from cell phone cases to golf club shafts. Typically, labels consist of thermoplastic color layers capable of being adhered to substrates upon application of heat and pressure. Many of the items to which the indicia are applied are rigid, or semi-rigid, thus allowing the label transfer to be carried out using heat transfer methods.

It is of utmost importance that the indicia or marking transferred to the item is of a high quality. In many instances, the item is one that is intended to be used for a long period of time. For example, cellular telephones are intended to last for at least a number of years, as are golf clubs. To this end, the printed indicia (e.g., the manufacturer's name, trademark or the like), should be long-lasting, difficult to abrade and resistant to chemical and environmental degradation.

Additionally, it is desirable in some applications that the label has a metallized finish section once the label is applied to the goods. The prior art has adopted various techniques to achieve the desired metallized effect.

In a known sequential technique, a standard metallic hot stamp foil is used, and the metallic portion of the indicia is transferred to the substrate using a hot stamp machine. The non-metallic portion of the indicia is then applied to the substrate using any number of prior art methods, such as pad printing or direct screening printing, or simply using a standard heat transfer label. However, this technique may be more expensive and time-consuming, requiring a multi-step process to achieve the desired effect.

A second technique used by the prior art is to selectively demetallize a film, print the non-metallic indicia on the selectively demetallized areas of the film and transfer the resulting label using standard heat transfer equipment. In this technique, a protective mask is printed on a vacuum metallized aluminum foil layer. The protective mask is printed on the foil in the shape of the desired metallized portion of the indicia. The foil layer then is demetallized by printing a caustic paste across the entire film and passing the film through a water bath to remove the aluminum layer from the film. In this manner, the aluminum foil layer remains in the areas that were covered by the protective mask. The non-metallic portion of the indicia is then printed in the areas of the label where the aluminum foil layer has been removed, and the label is applied to the substrate using traditional application methods. While this technique, unlike the preceding technique, allows for the label to be applied to the substrate in a one-step process, the necessary use of a caustic wash, and the additional cost required to treat the wastewater resulting from the caustic wash, make the use of this technique less desirable.

Accordingly, there exists a need for an efficient and high quality selectively metallized heat transfer label that allows the selective transfer of a metallic finish section of the label along with the transfer of a non-metallic ink section of the label. Desirably, such a label is chemically resistant to numerous environments. More desirably, such a label is made without the use of a caustic wash. Most desirably, such a label is applied to a substrate in a single-step application process and results in a clean, crisp transfer of the metallic section of the label.

BRIEF SUMMARY OF THE INVENTION

A selectively metallized heat transfer label includes in the preferred embodiment a support portion comprising a carrier layer and a release layer applied to the carrier layer, and a transfer portion comprising a protective layer applied to the release layer, a metallizable layer applied to the protective layer, a metal layer applied to the metallizable layer, a metal transferring adhesive layer applied to the metal layer and configured to adhere to both the metal layer and the desired substrate and a non-metal transferring ink layer applied to the metal layer and configured to adhere to the desired substrate but not to the metal layer.

Preferably, the protective layer and the metallizable layer are formed from the same material in separate layers. A holographic image can be formed, such as by printing or embossing, in the metallizable and/or the metal layers.

When heat and pressure are applied to the polyester film using conventional heat transfer equipment in order to transfer the label to a substrate, the metal transferring adhesive adheres to both the metal layer and the substrate while the non-transferring ink layer adheres only to the substrate. Thus, only the "selected" portion of the metal layer that is in contact with the metal transferring adhesive is transferred to the substrate, along with the corresponding portions of the metallizable layer and the protective layer, while the non-transferring ink section is transferred to the substrate without the corresponding portions of the metal layer, the metallizable layer and the protective layer.

These and other features and advantages of the present invention will be apparent from the following detailed description and drawings in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
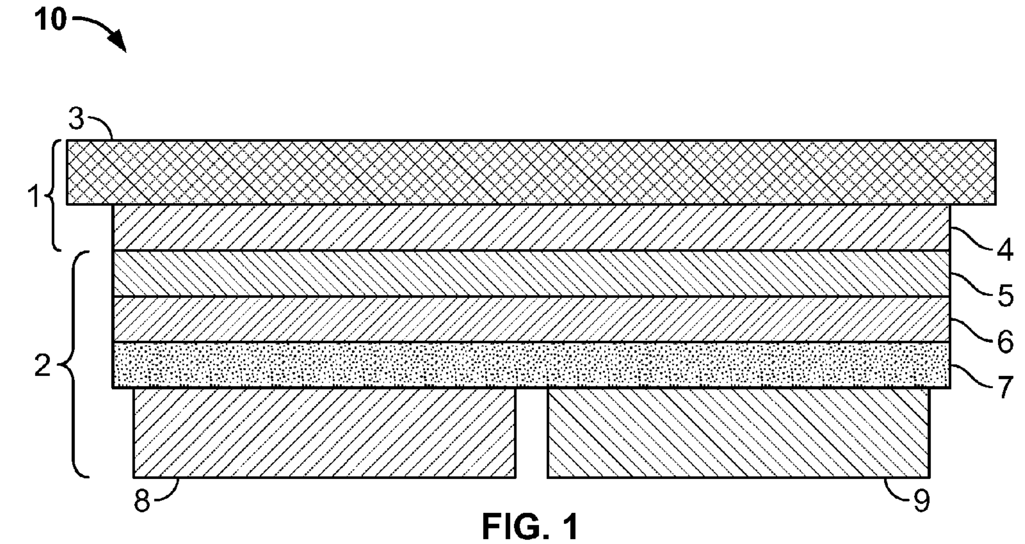
FIG. 1 is a cross-sectional view of a selectively metallized heat transfer label embodying the principles of the present invention, the label being shown as formed on a carrier or web; and, FIG. 2 is a cross-sectional view of the selectively metallized heat transfer label of FIG. 1 as applied to a substrate.

While the present invention is susceptible of embodiment in various forms, there is shown in the drawings and will hereinafter be described several preferred embodiments with the understanding that the present disclosure is to be considered an exemplification of the invention and is not intended to limit the invention to the specific embodiments illustrated.

It should be further understood that the title of this section of the specification, namely, "Detailed Description of the Invention," relates to a requirement of the United States Patent and Trademark Office, and does not imply, nor should be inferred to limit the subject matter disclosed herein.

Referring to FIG. 1, a selectively metallized heat transfer label 10 according to the present invention is shown. In the preferred embodiment, label 10 includes a support portion 1 and a transfer portion 2. Support portion 1 comprises a carrier layer 3 and a release layer 4 applied to carrier layer 3. Transfer portion 2 comprises a protective layer 5 applied to release layer 4 and a metallizable layer 6 applied to protective layer 5. Transfer portion 2 further comprises a metal layer 7 applied to metallizable layer 6 and a metal transferring adhesive layer 8 and non-metal transferring ink layer 9 applied to metal layer 7.

Carrier layer 3 is a paper or plastic film, as is well known in the prior art. However, a polyester film is preferred because, at least as compared to some other plastic materials like polyethylene and non-oriented polypropylene, polyester possesses more favorable mechanical properties and offers a more suitable surface for printing subsequent layers. In addition, unlike polyethylene, polyester does not tend to soften and become tacky at the types of temperatures typically encountered during transfer of label 10 to a substrate.

In the preferred embodiment, carrier layer 3 is a 92 gauge (92 ga) clear, untreated packaging grade polyester film as is well known in the art. As can be readily appreciated, one benefit of using a clear material for carrier layer 3 is that, if desired, one can inspect the quality of the subsequent printed layers of label 10 (until the application of metal layer 7, which typically is opaque) by looking at the layers through carrier layer 3.

Release layer 4 is a release material that preferably separates cleanly from transfer portion 2 of label 10 and is not transferred, to any visually discernable (with the naked eye) degree, to the substrate along with the portions of the other layers of label 10 that transfer to the substrate. To that end, release layer 4 is configured to adhere to carrier layer 3 more strongly than protective layer 5 adheres to release layer 4 when label 10 is applied to a substrate under heat and pressure. Preferably, release layer 4 is clear for the same reason carrier layer 3 is clear.

In the preferred embodiment, the release layer 4 composition comprises: about 0.5%, by weight, cellulose acetate resin (Eastman Chemical Company, Kingsport, Tenn.) dissolved in a solvent mixture of about 4.0%, by weight, diacetone alcohol (Astro Chemicals, Inc., Springfield, Mass.); 47.5%, by weight, ethyl acetate (Ashland Distribution, Dublin, Ohio); and 48.0%, by weight, methyl ethyl ketone (MEK) (Ashland Distribution, Dublin, Ohio). The above composition comprises about 0.5% solids and about 99.5% volatile organic compounds (VOCs).

To form release layer 4, the above described composition is deposited onto carrier layer 3, by direct gravure printing using a 360Q cylinder (Pamarco Technologies, Inc., Roselle, N.J.) in the preferred embodiment. After deposition of the release layer composition onto carrier layer 3, the VOCs evaporate leaving only the non-volatile components thereof to make up release layer 4. In the preferred embodiment, the dry coat weight of release layer 4 is less than 0.05 lbs/3000 sq. ft.

Protective layer 5 typically is a lacquer material designed to provide a chemically and environmentally resistant outer surface to transfer portion 2 of label 10 after it is applied to a substrate. Various such lacquer materials are well known in the prior art.

In the preferred embodiment, protective layer 5 is configured to adhere to release layer 4 less strongly than metallizable layer 6 adheres to protective layer when label 10 is applied to a substrate under heat and pressure. Additionally, protective layer 5 preferably is clear to allow metal layer 7 to be visible once label 10 is applied to a substrate.

Preferably, the protective layer 5 composition comprises: about 36.0%, by weight, EPON 1001-B-80 resin solution (comprised of about 80.0%, by weight, phenol, 4,4'-(1-methylethylidene)bis-, polymer with 2,2'-[(1-methylethylidene) bis(4, 1-phenylene oxymethylene)] bis[oxirane], and about 20.0%, by weight, MEK)) (Hexion Specialty Chemicals, Inc. Houston, Tex.); about 34.5%, by weight, MEK (Ashland Distribution, Dublin, Ohio); about 22.5%, by weight, Chempol CCP18-3984 hydroxyl functional acrylic polyol (CCP Polymers, Kansas City, Mo.); about 3.0%, by weight, Cymel 303 cross linking agent (Cytec Industries Inc., West Paterson, N.J.); about 1.6%, by weight, Cycat 4040 catalyst (Cytec Industries Inc., West Paterson, N.J.); about 1.0%, by weight, BYK-310 silicone surface additive (BYK-Chemie GmbH, Wesel, Germany); about 1.0%, by weight, Slipayd SL177 slip agent (TMC Materials, Worcester, Mass.); about 0.2%, by weight, of a mixture of 50.0%, by weight, isopropanol 99% (Ashland Distribution, Dublin, Ohio) and 50.0%, by weight, phosphoric acid 85% (Hubbard Hall, Waterbury, Conn.); and about 0.1%, by weight, of Bentone 34 rheological additive (Rheox, Inc., Heightstown, N.J.). The above composition contains about 49.0%, by weight, solids and about 51.0%, by weight, VOCs.

To form protective layer 5, the above described composition is deposited onto release layer 4, by direct gravure printing using a 360Q cylinder (Pamarco Technologies, Inc., Roselle, N.J.) in the preferred embodiment. In the preferred embodiment, after deposition of the protective layer composition onto release layer 4, protective layer 5 is cured at a temperature greater than 300° F., causing the VOCs evaporate and leaving only the cured non-volatile components thereof to make up protective layer 5. In the preferred embodiment, the dry coat weight of protective layer 5 is about 1.00 lbs/3000 sq. ft.

In some embodiments of the present invention, protective layer 5 may be omitted if the additional chemical and environmental resistance of protective layer 5 is not required in a particular application.

Metallizable layer 6 provides a composition and a surface that adheres to protective layer 5 and to which metal layer 7 may be readily applied. In the preferred embodiment, metallizable layer 6 adheres to protective layer 5 at least as strongly as metal layer 7 adheres to metallizable layer 6 when label 10 is applied to a substrate under heat and pressure.

Preferably, metallizable layer 6 is clear, like protective layer 5, to allow metal layer 7 to be visible once label 10 is applied to a substrate. However, in some embodiments of the present invention, metallizable layer 6 may be colored. By coloring metallizable layer 6, when metal layer 7 is viewed through metallizable layer 6 after label 10 is applied to a substrate, the apparent color of metal layer 7 may be altered. For example, if metal layer 7 has a natural metallic silver color (such as when metal layer 7 is comprised of aluminum, as in the preferred embodiment), coloring metallizable layer 6 may make metal layer 7 appear to have a metallic gold, blue, green, red or other desired metallic color. Compatible pigments and dyes that may be used to color metallizable layer 6 are known to those skilled in the art, and include automotive grade pigment dispersions (in applications where UV stability is required) and solvent soluble dyes (in applications where UV stability is not required).

In the preferred embodiment, the metallizable layer 6 composition comprises: about 65.5%, by weight, MEK solvent (Ashland Distribution, Dublin, Ohio); about 33.0%, by weight, clear base (comprised of about 48.5%, by weight, nitrocellulose in solution (101078 (390-C5-175) from Akzo Nobel, Arnhem, Amsterdam), about 13.0%, by weight, ethyl acetate 99% ester (Ashland Distribution, Dublin, Ohio), about 10.0%, by weight, Cymel 370 resin cross linking agent (Cytec Industries, Inc., West Paterson, N.J.), about 10.0%, by weight, Epon 828 liquid epoxy resin (Hexion Specialty Chemicals, Inc., Houston, Tex.), about 5.0%, by weight, MEK solvent (Ashland Distribution, Dublin, Ohio), about 5.0%, by weight, Cymel U-80 resin (Cytec Industries Inc., West Paterson, N.J.), about 4.5%, by weight, toluene solvent (Ashland Distribution, Dublin, Ohio), about 2.0%, by weight, Uvinul N-3035 (N-35) cyanoacrylate light stabilizer (BASF Corporation, Florham Park, N.J.) and about 2.00%, by weight, Uvinul 3039 (N-539) cyanoacrylate light stabilizer (BASF Corporation, Florham Park, N.J.)); about 1.0%, by weight, of Cycat 4040 catalyst (Cytec Industries Inc., West Paterson, N.J.); and about 0.3%, by weight, of a mixture of 50.0%, by weight, isopropanol 99% (Ashland Distribution, Dublin, Ohio) and 50.0%, by weight, phosphoric acid 85% (Hubbard Hall, Waterbury, Conn.). The above composition contains about 15.0%, by weight, solids and about 85.0%, by weight, VOCs.

To form metallizable layer 6, the above described composition is deposited onto protective layer 5, by direct gravure printing using a 360Q cylinder (Pamarco Technologies, Inc., Roselle, N.J.) in the preferred embodiment. In the preferred embodiment, after deposition of the metallizable layer composition onto protective layer 5, metallizable layer 6 is cured at a temperature greater than 300° F., causing the VOCs evaporate and leaving only the cured non-volatile components thereof to make up metallizable layer 6. In the preferred embodiment, the dry coat weight of metallizable layer 6 is about 0.30 lbs/3000 sq. ft.

Metal layer 7 in the preferred embodiment is comprised of aluminum. To form metal layer 7, aluminum is deposited onto metallizable layer 6 by standard resistance metallizing techniques that are well known in the prior art. In the preferred embodiment, metal layer 7 is deposited to an optical density range of about 2.2 to about 2.5. Additionally, metal layer 7 is configured to adhere to metallizable layer 6 at least as strongly as metal transferring adhesive layer 8 adheres to metal layer 7 when label 10 is applied to a substrate under heat and pressure Metal transferring adhesive layer 8 is configured to adhere both to metal layer 7 and the particular substrate to which label 10 is to be applied (in the case of label 10 in the preferred embodiment, the substrates include PETG cosmetic jars and painted graphite golf club shafts). Further, metal transferring adhesive layer 8 preferably adheres to metal layer 7 at least as strongly as adhesive layer 8 adheres to the particular substrate to which label 10 is to be applied (PETG and graphite golf club shafts) when label 10 is applied to a substrate under heat and pressure.

In the preferred embodiment, the metal transferring adhesive layer 8 composition is comprised of: about 50.2%, by weight, UCAR VMCA solution vinyl resin (The Dow Chemical Company, Midland, Mich.); about 14.4%, by weight, Adhesion Resin LTH (Degussa Coatings and Colorants, Parsippany, N.J.); about 11.0%, by weight, SST-3 micronized Teflon (Shamrock Technologies, Inc., Newark, N.J.); about 12.8%, by weight, famed silica (Cabot Corporation, Boston, Mass.); about 10.41%, by weight, S160 plasticizer (Eastman Chemical Company, Kingsport, Tenn.); and about 1.2%, by weight, Foamex N defoamer (Tego Chemie Service GmbH, Essen, Germany). The above composition contains about 37.5%, by weight, solids and about 62.5%, by weight, VOCs.

To form metal transferring adhesive layer 8 in the preferred embodiment, the above described composition is screen printed onto a selected portion of metal layer 7 through a mesh screen, preferably a polyester mesh screen, with 380 lines per inch and allowed to dry. The dry thickness of metal transferring adhesive layer 8 in the preferred embodiment is about 0.0001" to 0.0003", but preferably about 0.0001".

Non-metal transferring ink layer 9 is configured not to adhere to metal layer 7, but only to the particular substrate to which label 10 is to be applied (in the case of label 10 in the preferred embodiment, the substrates include PETG cosmetic jars and painted graphite golf club shafts) when label 10 is applied to a substrate under heat and pressure.

In the preferred embodiment, the non-metal transferring ink layer 9 composition is comprised of: about 21.6%, by weight, UCAR VYHD solution vinyl resin (The Dow Chemical Company, Midland, Mich.); about 4.6%, by weight, S160 plasticizer (Eastman Chemical Company, Kingsport, Tenn.); about 0.3%, by weight, Foamex N defoamer (Tego Chemie Service GmbH, Essen, Germany); about 1.4%, by weight, Cab-O-Sil silica aerogel (Cabot Corporation, Boston, Mass.); about 17.5%, by weight, pigment; about 47.2%, by weight, cyclohexanone solvent (commercially available from many sources); about 3.4%, by weight, dibasic ester solvent (commercially available from many sources); and about 4.1%, by weight, Aromatic 150 solvent (ExxonMobil Chemicals, Houston, Tex.). The above composition contains about 45.4%, by weight, solids and about 54.6%, by weight, VOCs.

It will be appreciated that the pigment used in the composition of non-metal transferring ink layer 9 will vary depending upon the particular color(s) desired for non-metal transferring ink layer 9. For example, the pigment may comprise myriad combinations of any number of organic and inorganic pigments, including: titanium dioxide white pigment (commercially available from many sources), Irgazin Red DPP-BO, Cromophtal Scarlet RN, Irgalite Yellow LBG and Irgalite Blue LGLD colored organic pigments (all commercially available from Ciba Specialty Chemicals, Tarrytown, N.Y.), TiPure R960 white inorganic pigment (E. I. du Pont de Nemours and Company, Wilmington, Del.), Monarch M120 black inorganic pigment (Cabot Corporation, Boston, Mass.) and Bayferrox 318M iron oxide black pigment (Bayer AG, Germany). Those skilled in the art will appreciate that the preceding list of pigments identifies only a small fraction of the pigments that may be used to create a specific desired color of non-metal transferring ink layer 9, and many different pigments and pigment combinations are possible, all of which are within the scope of the present invention.

To form non-metal transferring ink layer 9 in the preferred embodiment, the above described composition is screen printed onto a portion of metal layer 7 different from the portion of metal layer 7 on which metal transferring adhesive layer 8 is printed. Non-metal transferring ink layer 9 preferably is screen printed through a stainless steel mesh screen with 270 lines per inch and permitted to dry. The dry thickness of non-metal transferring ink layer 9 in the preferred embodiment is about 0.0001" to 0.0003", but preferably about 0.0002".

To apply label 10 to a substrate, heat and pressure are applied to carrier layer 3 using conventional heat transfer equipment, such as, in the preferred embodiment, a Stamprite hot stamping machine (for applying label 10 to PETG jars) or a USI golf shaft machine (for applying label 10 to a painted graphite golf shaft).

Figure 2:
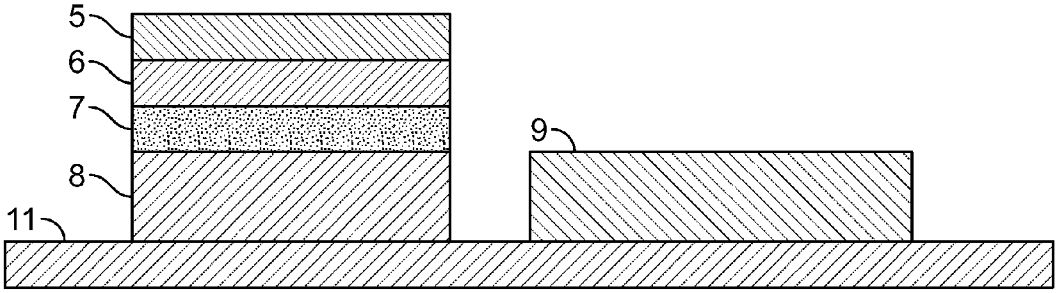

As shown in FIG. 2, when heat and pressure are applied to carrier layer 3 of label 10 to apply label 10 to a substrate 11, non-metal transferring ink layer 9 adheres only to substrate 11 and does not adhere to metal layer 7. However, metal transferring adhesive layer 8 adheres to both substrate 11 and metal layer 7.

Because metal transferring adhesive layer 8 adheres to substrate 11 more strongly than protective layer 5 adheres to release layer 4, and because protective layer 5, metallizable layer 6, metal layer 7 and metal transferring adhesive layer 8 adhere more strongly to each than protective layer 5 adheres to release layer 4, as support portion 1 separates from transfer portion 2 (at the interface of release layer 4 and protective layer 5) after the application of heat and pressure to label 10, only that portion of metal layer 7 in contact with metal transferring adhesive layer 8 (and the complementary portions of metallizable layer 6 and protective layer 5) are transferred to substrate 11. The remaining portions of metal layer 7, metallizable layer 6 and protective layer 5 (those portions outside of metal transferring adhesive layer 8) are not transferred to substrate 11 because non-metal transferring ink layer 9 does not adhere to metal layer 7.

It should be understood that the particular compositions of carrier layer 3, release layer 4, protective layer 5, metallizable layer 6, metal layer 7, metal transferring adhesive layer 8 and non-metal transferring ink layer 9 may vary from the specific compositions disclosed herein depending upon the composition of substrate 11 to which label 10 is to be applied and the desired color of metal layer 7, as long as non-metal transferring ink layer 9 adheres to substrate 11 but does not adhere to metal layer 7, metal transferring adhesive layer 8 adheres to substrate 11 more strongly than protective layer 5 adheres to release layer 4, and protective layer 5, metallizable layer 6, metal layer 7 and metal transferring adhesive layer 8 adhere more strongly to one another than protective layer 5 adheres to release layer 4.

For example, the composition of metal transferring adhesive layer 8 may be based on any number of base resins that adhere to aluminum (or any other metal chosen for metal layer 7) and to the particular substrate. Similarly, the composition of non-metal transferring ink layer 9 may be based on any number base resins that do not adhere to aluminum (or another metal chosen for metal layer 7), but do adhere to the particular substrate.

In general terms, most vinyl (other than VMCA), acrylic, epoxy, phenoxy and chlorinated polyolefin (CPO) based resins will not adhere to metal layer 7 but will adhere to a wide range of substrates. Thus, non-metal transferring ink layer 9 may be comprised of such resins. For example, using the VYHD-based composition of non-metal transferring ink layer 9 in the preferred embodiment, in addition to PETG and painted graphite, label 10 may be applied to other substrates such as acrylonitrile butadiene styrene (ABS) plastic, polycarbonate (PC) plastic, styrene plastic and acrylic plastic.

However, should it be desired to apply label 10 to a polypropylene or thermoplastic olefin (TPO) substrate, for example, the composition of metal transferring adhesive layer 8 may be based on a chlorinated polyolefin-based resin (such as Eastman CPO 343-1, which adheres both to metal layer 7 and to polypropylene and TPO substrates) instead of VCMA, and the composition of non-metal transferring ink layer 9 may be based on a different chlorinated polyolefin-based resin (such as Eastman CPO 515-2, which does not adhere to metal layer 7 but does adhere to polypropylene and TPO substrates) instead of VYHD.

Those skilled in the art will be familiar with the various compositions of carrier layer 3, release layer 4, protective layer 5, metallizable layer 6, metal layer 7, metal transferring adhesive layer 8 and non-metal transferring ink layer 9 that may be used depending upon the composition of the particular substrate to which label 10 is to be applied. It will be appreciated that all such various compositions are within the scope of the present invention.

Figure 3:
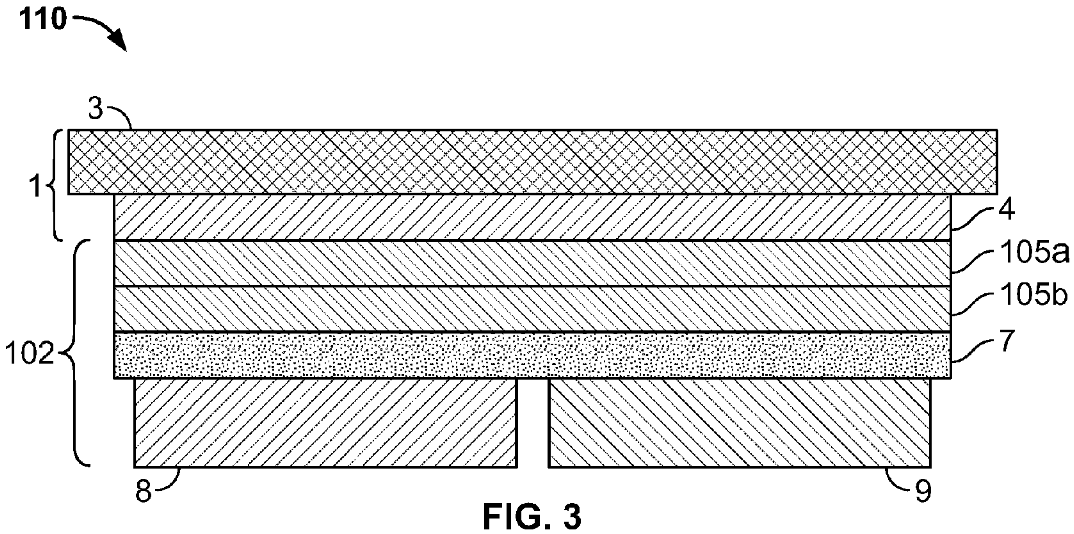
FIG. 3 is a cross-sectional view of a selectively metallized heat transfer label on a carrier or web, in which the protective layer and the metallizable layer are formed from the same material.
Figure 4:
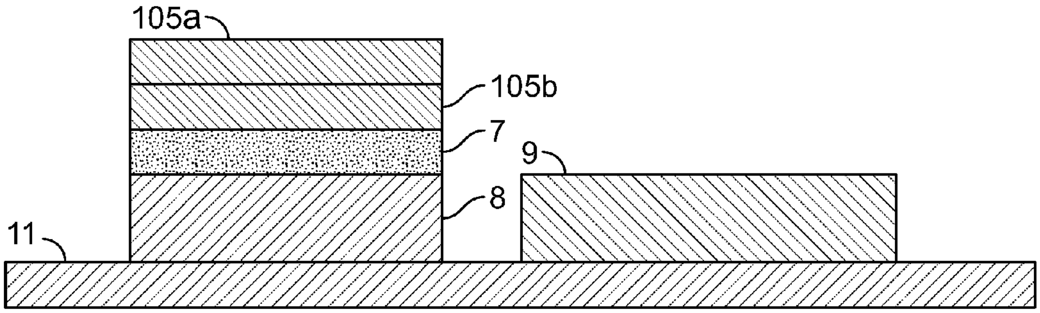
FIG. 4 is a cross-sectional view of the selectively metallized heat transfer label of FIG. 3 as applied to a substrate.
Figure 5:
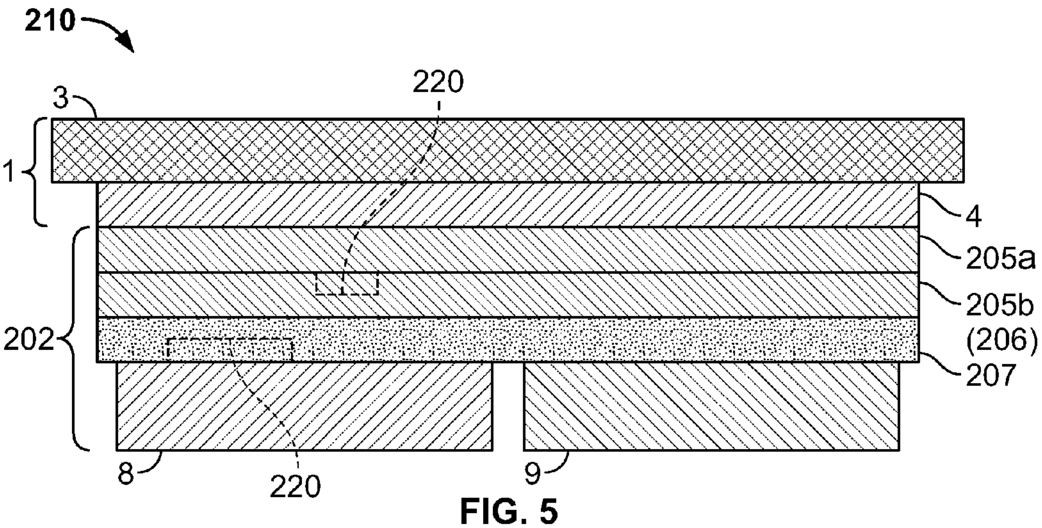
FIG. 5 is a cross-sectional view of a selectively metallized heat transfer label on a carrier or web in which the protective layer and the metallizable layer are formed from the same material and in which a holographic image is shown formed in the metallizable and the metal layers; and, FIG. 6 is a cross-sectional view of the selectively metallized heat transfer label of FIG. 5 as applied to a substrate.

In another embodiment, of the label 110, as seen in FIGS. 3 and 4, the protective layer **105*a* and the metallizable layer 105*b* are two separate layers of the same material or formulation. The protective layer 105*a* is applied to the release layer 104 and the metallizable layer 105*b* is applied to the protective layer 105*a***. It has been found that this construction provide superior graphics resolution upon transfer. In fact, it has been noted that lines weights as small as 0.006 inches can be transferred cleanly and without filling in. For example, text that includes a lower case "o" is transferred cleanly and clearly compared to other selective demetallization processes, such that the center of the "o" is open, rather than appearing as a filled circle.

Each layer of the composition is comprised of: about 14.8%, by weight, MEK solvent (Ashland Distribution, Dublin, Ohio); about 43.0%, by weight, toluene solvent (Ashland Distribution, Dublin, Ohio); about 26.0%, by weight, paraloid A-646 resin (comprised of about 45%, by weight, polymethmethacrylate (PMMA) and about 55%, by weight, MEK) (Rohm and Haas company, Philadelphia, Pa.); about 14.36%, by weight, clear base (comprised of about 48.5%, by weight, nitrocellulose in solution (101078 (390-C5-175) from Akzo Nobel, Arnhem, Amsterdam); about 1.80%, by weight, Cymel 303 cross linking agent (Cytec Industries Inc., West Paterson, N.J.); and about 0.04%, by weight, Cycat 296-9 catalyst (Cytec Industries Inc., West Paterson, N.J.). The remaining layers, namely, the carrier layer 3, release layer 4, metal layer 7, metal transferring adhesive layer 8 and non-metal transferring ink layer 9 are all of the same or similar materials to that of the first label 10 embodiment disclosed above. The protective layer **105*a* has a dry coat weight of about 0.40 lbs/3000 sq. ft. to about 0.60 lbs/3000 sq. ft. and is preferably at a dry coat weight of about 0.50 lbs/3000 sq. ft. The metallizable layer 105*b*** has a dry coat weight of about 0.40 lbs/3000 sq. ft. to about 0.60 lbs/3000 sq. ft. and is preferably at a dry coat weight of about 0.50 lbs/3000 sq. ft.

Figure 6:
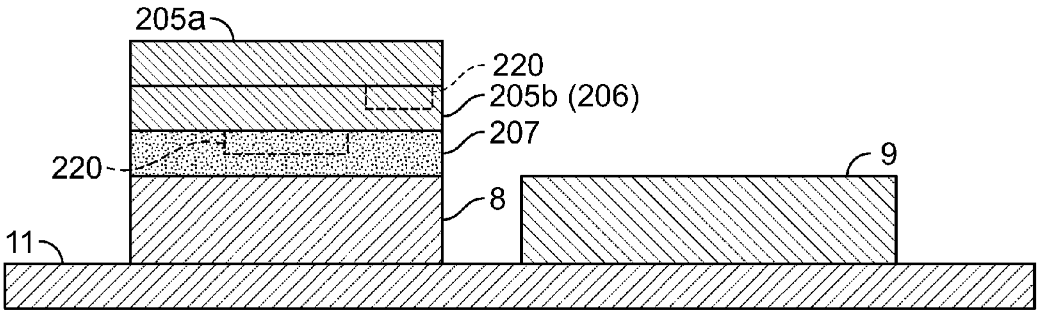

Referring now to FIGS. 6 and 7, it has been found that the label 210 can include a holographic image or holographic section 220. In such a label, the holographic image can be formed in the metallizable layer **205*b*/206 or the metal layer 207. In a present form of the label (illustrated in FIGS. 6 and 7), the protective coat 205*a* and metallizable layer 205*b* are two separate layers of the same material or formulation and the metal layer 207 is applied on the metallizable layer 205*b*. The metal layer 207 can be a vacuum metallized aluminum layer 207** that is applied using methods that will be recognized by those skilled in the art.

In any of the constructions, when heat and pressure are applied to the carrier layer (film) 3, the transfer portion 2, 102, 202 will transfer to the substrate 11. The adhesive 8 adheres the metal layer 7, 207 along with the metallizable layer 6, **105*b*, 205*b* and the protective layer 5, 105*a*, 205*a***.

As set forth above, the holographic section or image 220 can be formed, such as by embossing, in either the metallizable layer **205*b* or the metal layer 207. The non-foil transferring ink 9 is formulated to only adhere to the substrate 11 and not to the metal layer 207. As such, this construction allows the selective transfer of a metallic holographic section 220 of the label 210 along with a nonmetallic color (from the non-foil ink 9). The holographic image can be provided in the label 210 and can be formed (e.g., printed, embossed or the like) in either the metallizable layer 205***b* and/or the metal layer 207, by methods that will be recognized by those skilled in the art.

In the present disclosure, the words "a" or "an" are to be taken to include both the singular and the plural. Conversely, any reference to plural items shall, where appropriate, include the singular.

All patents referred to herein, are hereby incorporated herein by reference, whether or not specifically done so within the text of this disclosure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A selectively metallized heat transfer label for application to a substrate comprising:

a carrier layer;

a release layer applied to the carrier layer;

a protective layer applied to the release layer;

a metallizable layer applied to the protective layer;

a metal layer applied to the metallizable layer;

a metal transferring adhesive layer applied to a first portion of the metal layer; and a non-metal transferring layer applied to a second portion of the metal layer;

wherein the metal transferring adhesive layer is configured to adhere to the metal layer upon application of heat and pressure to the label and wherein the non-metal transferring layer is configured to not adhere to the metal layer upon application of heat and pressure to the label.

2. The selectively metallized heat transfer label of claim 1 wherein the carrier layer comprises a polyester film.

3. The selectively metallized heat transfer label of claim 1 wherein the release layer comprises a cellulose acetate resin.

4. The selectively metallized heat transfer label of claim 1 wherein the protective layer has a dry coat weight of about 0.50 lbs/3000 sq. ft.

5. The selectively metallized heat transfer label of claim 1 wherein the metallizable layer is formed from the same material as the protective layer, and wherein the metallizable layer and the protective layer are formed as separate layers.

6. The selectively metallized heat transfer label of claim 5 wherein the metallizable layer and the protective layer are formed from a nitrocellulose based material.

7. The selectively metallized heat transfer label of claim 6 wherein the nitrocellulose based material is in a solvent of one or both of methylethylketone and toluene.

8. The selectively metallized heat transfer label of claim 1 wherein the metallizable layer is colored.

9. The selectively metallized heat transfer label of claim 1 wherein the metallizable layer has a dry coat weight of about 0.50 lbs./3000 sq. ft.

10. The selectively metallized heat transfer label of claim 1 wherein the metal layer comprises aluminum.

11. The selectively metallized heat transfer label of claim 1 wherein the metal transferring adhesive layer comprises a vinyl-based resin.

12. The selectively metallized heat transfer label of claim 1 wherein the non-metal transferring layer is comprised of an ink having a vinyl-based resin.

13. The selectively metallized heat transfer label of claim 1 wherein a holographic image is formed in one or both of the metallizable layer and the metal layer.

14. The selectively metallized heat transfer label of claim 1 wherein the metal transferring adhesive layer is configured to adhere to the metal layer and the substrate upon application of heat and pressure to the label and wherein the non-metal transferring layer is configured to adhere to the substrate but not adhere to the metal layer upon application of heat and pressure to the label such that portions of the metal layer in contact with the metal transferring adhesive layer are transferred to the substrate while the non-metal transferring layer is transferred to the substrate without corresponding portions of the metal layer.

15. A selectively metallized heat transfer label applied to a substrate using heat and pressure comprising:

a non-metal transferring ink layer disposed on a first portion of the substrate;

a metal transferring adhesive layer disposed on a second portion of the substrate;

a metal layer disposed on the metal transferring adhesive layer;

a metallizable layer disposed on the metal layer; and a protective layer disposed on the metallizable layer.

16. The selectively metallized heat transfer label applied to a substrate of claim 15 wherein the metallizable layer is formed from the same material as the protective layer, and wherein the metallizable layer and the protective layer are formed as separate layers.

17. The selectively metallized heat transfer label applied to a substrate of claim 16 wherein the metallizable layer and the protective layer are formed from a nitrocellulose based material.

18. The selectively metallized heat transfer label applied to a substrate of claim 17 wherein the nitrocellulose based material is in a solvent of one or both of methylethylketone and toluene.

19. The selectively metallized heat transfer label applied to a substrate of claim 15 wherein a holographic image is formed in one or both of the metallizable layer and the metal layer.

20. A method of making a selectively metallized heat transfer label comprising the steps of:

providing a carrier layer having a release layer thereon;

applying a protective layer to the release layer;

applying a metallizable layer to the protective layer;

applying a metal layer to the metallizable layer;

applying a metal transferring adhesive to a first portion of the metal layer; and applying a non-metal transferring layer to a second portion of the metal layer, wherein the metal transferring adhesive layer is configured to adhere to the metal layer upon application of heat and pressure to the label and wherein the non-metal transferring layer is configured to not adhere to the metal layer upon application of heat and pressure to the label.

21. The method of making a selectively metallized heat transfer label of claim 20 wherein the metallizable layer is formed from the same material as the protective layer, and wherein the metallizable layer and the protective layer are applied as separate layers.

22. The selectively metallized heat transfer label applied to a substrate of claim 21 wherein the metallizable layer and the protective layer are formed from a nitrocellulose based material.

23. The selectively metallized heat transfer label applied to a substrate of claim 22 wherein the nitrocellulose based material is in a solvent of one or both of methylethylketone and toluene.

24. The selectively metallized heat transfer label applied to a substrate of claim 20 wherein a holographic image is formed in one or both of the metallizable layer and the metal layer.

25. A method of applying a selectively metallized heat transfer label to a substrate comprising the steps of:

providing a selectively metallized heat transfer label having a carrier layer, a release layer applied to the carrier layer, a protective layer applied to the release layer, a metallizable layer applied to the protective layer, a metal layer applied to the metallizable layer, a metal transferring adhesive layer applied to a first portion of the metal layer, and a non-metal transferring layer applied to a second portion of the metal layer, wherein the metal transferring adhesive layer is configured to adhere to the metal layer upon application of heat and pressure to the label and wherein the non-metal transferring layer is configured to not adhere to the metal layer upon application of heat and pressure to the label;

providing a substrate;

disposing the label on the substrate;

applying heat and pressure to the label; and removing the carrier layer, at least a portion of the release layer, at least a portion of the metallizable layer, at least a portion of the protective layer, at least a portion of the metallizable layer and at least a portion of the metal layer.

26. The method of applying a selectively metallized heat transfer label to a substrate in claim 25 wherein the metallizable layer is formed from the same material as the protective layer, and wherein the metallizable layer and the protective layer are applied as separate layers.

* * * * *